C. W. LEVALLEY.
CHAIN.
APPLICATION FILED NOV. 30, 1908.
975,965.
Patented Nov. 15, 1910.
2 SHEETS—SHEET 2.
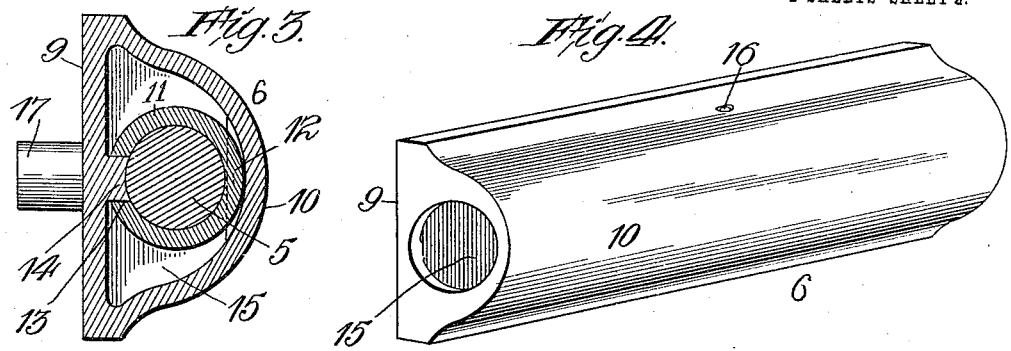
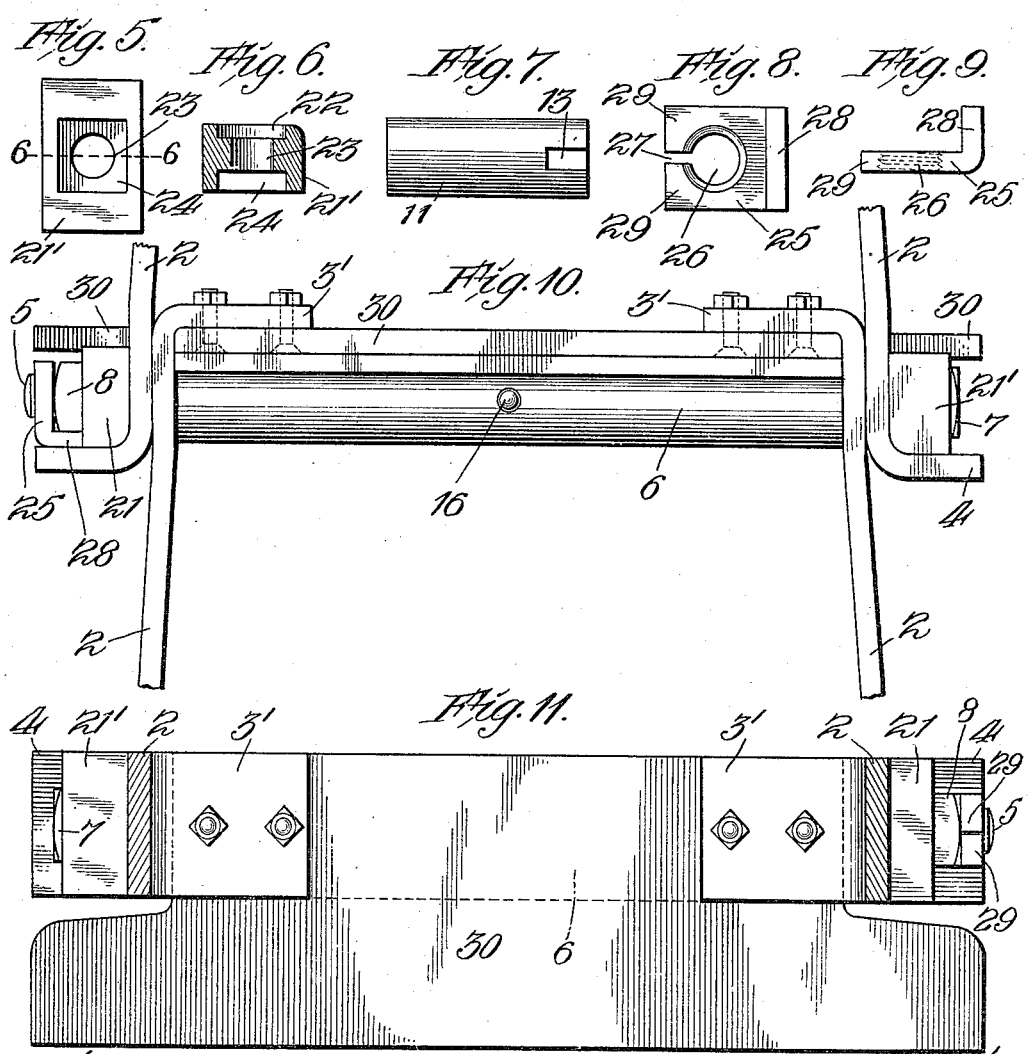
Witnesses:
Paul J. Gathmann
Inventor
Christopher W. Levalley
By his Attorney
J. S. Barker

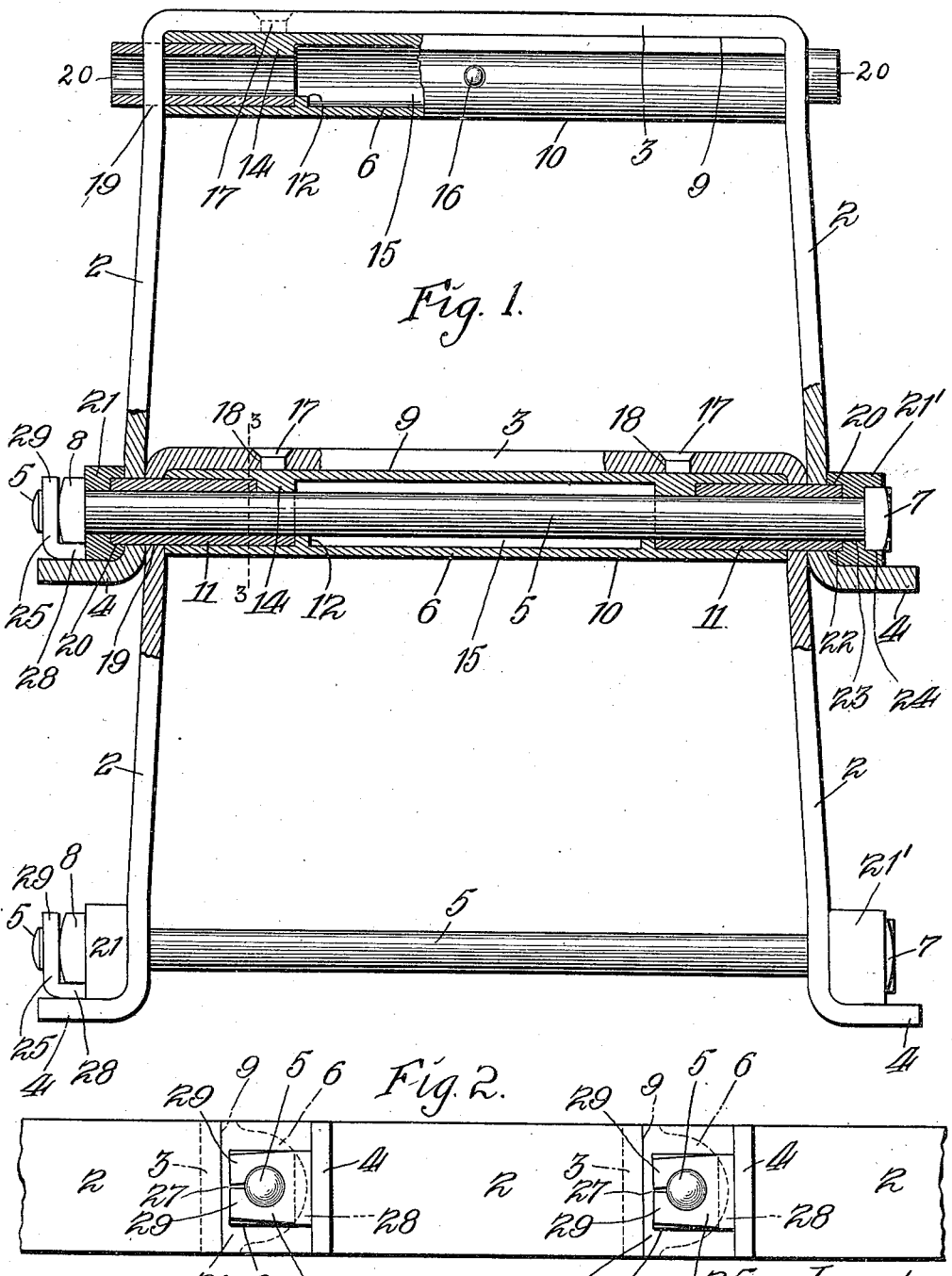

UNITED STATES PATENT OFFICE.

CHRISTOPHER W. LEVALLEY, OF MILWAUKEE, WISCONSIN.

CHAIN.

975,965.            Specification of Letters Patent.     Patented Nov. 15, 1910.

Application filed November 30, 1908. Serial No. 465,258.

*To all whom it may concern:*

Be it known that I, CHRISTOPHER W. LEVALLEY, a citizen of the United States, residing at Milwaukee, in the county of Milwaukee and State of Wisconsin, have invented certain new and useful Improvements in Chains, of which the following is a specification.

My invention relates to improvements in chains, particularly such as are used for conveying purposes, and has for its object to produce a chain simple in construction, possessing great strength and having advantages which will be apparent to those skilled in the art, and some of which will be hereinafter stated.

In the accompanying drawings—Figure 1 is a plan view of a section of a chain embodying my improvements, parts being broken away or represented in horizontal section; Fig. 2 is a side view of the section of chain represented in Fig. 1; Fig. 3 is a section taken on the line 3—3 of Fig. 1; Fig. 4 is a perspective view of the hollow cross-bar of the chain detached; Fig. 5 is an end view of one of the interlocking blocks used at the head end of the connecting cross bolt or pintle; Fig. 6 is a sectional view of the interlocking block taken on the line 6—6 of Fig. 5; Fig. 7 is a detail view of one of the wearing sleeves that is inserted into the hollow cross-bar; Fig. 8 is a side view of the lock for the nut on the connecting bolt or pintle; Fig. 9 is an edge view of the lock shown in Fig. 8; Fig. 10 is a plan view of parts of two links of a chain of a different construction from that illustrated in Figs. 1 and 2; Fig. 11 is an end view of the chain link shown in Fig. 10.

In the drawings 2—2 indicate the side bars of the chain. These are preferably formed of bar metal, wrought iron or steel, and may be integral, being connected by a cross piece 3 that constitutes a portion of the cross-bar of the link, as indicated in Figs. 1 and 2. The ends of the side bars are preferably out-turned, as indicated at 4. These out-turned portions serve as seats for the interlocking blocks and the nut-locking means which will be hereinafter described, and they may also be extended sufficiently far to serve as wings for conveying purposes, if desired.

At one end of each link,—the end having the cross-bar 3 that unites the side bars when the chain is of the form indicated in Fig. 1,—there is a hollow cross-bar 6, separate from the side bars but fixedly united therewith, through which passes the connecting bolt or pintle 5 that serves to unite the connected links. The bolt is formed at one end with a head 7 and its opposite end is screw-threaded to receive the nut 8. One face, 9, of the hollow cross-bar 6, is flat, and lies against the connecting bar 3, while the other face, 10, is round, in order to afford a proper bearing surface for the teeth of the sprocket or driving wheels. The longitudinal opening through the hollow cross-bar is cylindrical-shaped for a certain distance inward from each end, in order to provide close-fitting bearings for the wearing sleeves 11. The latter are formed of hard steel, and the openings through them are of a size to fit the pintle 5. In order to determine the position which each pintle shall occupy, as well as to securely hold it in place, I form the hollow cross-bar with an inwardly extending projection 12 that constitutes an abutment against which the inner end of the sleeve bears, thereby determining the extent to which the sleeve may be set into the bar. The sleeve is near one—its inner—end, cut away at 13, and the slot thus formed passes over a projection 14 extending inward from the wall of the hollow cross-bar, this means serving to prevent any rotation of the sleeve within its seat. Between the inner ends of the sleeves there is formed a lubricant receptacle or chamber 15, to which access is had through the oil hole 16. From the flat face of the hollow cross-bar two or more rivets or studs 17 extend outward and register with apertures 18 formed in the cross-bar 3. By expanding or upsetting the ends of these rivets or studs, as indicated in Fig. 1, the hollow cross-bar 6 is secured in place and a composite end bar to the chain is formed, composed of the cross piece 3, directly uniting the two side bars and the hollow cross-bar 6, in which are formed the seats for the pintle or connecting bolt. The outer ends of the wearing sleeves 11 extend beyond the ends of the hollow cross-bar 6 sufficiently far to project through registering apertures 19 formed in the overlapping side bars, and some distance beyond, the extreme exposed ends constituting interlocking hubs 20.

Over these hubs are fitted the interlocking blocks 21—21', the former being arranged at the nut end of the bolt or pintle 5, and the latter at the head end thereof. These blocks correspond in vertical dimensions with the side bars 2 of the links, and are seated in the corners formed between the side bars and the out-turned end portions 4 thereof, being thus securely held against movement. Each block is perforated, the perforation being irregular in shape and comprising an inner enlarged portion or part 22 that forms a seat for the hub 20, and a portion 23 of smaller diameter that fits the bolt or pintle 5. Besides these parts the block 21' is formed with a recess 24 connecting with the pintle seat 23, in which is seated the head 7 of the bolt or pintle. The nut 8 upon the bolt bears against the outer face of the block 21, and when screwed up in place binds together and properly unites the parts of the chain at the joints.

Great difficulty has been experienced in maintaining tight joints, and various expedients have been resorted to for this purpose, with a greater or less degree of success. I have devised an improved lock for holding the nut after it has been screwed in place. It consists of the lock represented detached in Figs. 8 and 9. This lock consists of a piece or plate of metal of proper thickness bent into L-shape. The main part 25 of the lock is perforated at 26, and such perforation is screw-threaded. From one edge of the part 25 to the aperture 26 there is formed a slot 27, this slot being opposite the edge from which extends the leg or angularly-disposed part 28 of the lock. The internal diameter of the screw-threaded aperture 26 is such that the lock may be freely slipped endwise over the bolt 5. The method of applying the lock to hold the nut against turning will be readily understood. After the nut is screwed into place the lock is applied endwise, as represented in Fig. 1, the leg or bent end 28 entering the space between the nut and the out-turned end 4 of the side bar, which prevents rotation of the lock and in consequence any rotation of the nut. The lock is secured upon the bolt by forcing the two arms 29, produced by forming the slot 27, toward each other, so that the internal threads formed in the plate 25 are caused to engage with the threads of the bolt. This is accomplished by suitable tool or by simply hammering the parts together. When the lock has thus been set in place it is practically impossible for it to accidentally become loose. On the other hand it can be easily removed by forcing apart the ends of the arms 29, by means of a cold chisel or other suitable implement.

It will be understood that the cross-bar of the chain and wearing sleeves 11 carried thereby turn with the link about the pintle, which is held by the connected link. The projecting hubs 20 constitute lengthened draft bearings at the joints of the links, the interlocking blocks being in effect thickened portions of the side bars.

In Figs. 10 and 11 I have shown a modification of my invention, in which the side bars are not directly united by an integral connection. In this form of my invention the ends 3' of the side bars are in-turned and extend sufficiently far to form bearings and attaching plates for the hollow cross-bar 6. The space between the ends of the in-turned portions 3' may be and preferably is occupied by a plate or bar 30 which may be attached to the cross-bar 6 by any suitable means. The plate or bar 30 may be of any suitable shape and size to constitute a flight or other conveying projection.

It will be understood that the exposed edges of the cross-bars 3 of the form of link shown in Figs. 1 and 2 may serve for pushing the material when the chain is used for certain kinds of conveying work.

It will be observed that the hollow cross bar 6 is fixedly attached to or connected with the side bars of the chain, and lies entirely within the side bars, that is to say, it has no parts entering the registering perforations in the side bars. This brings the connecting or attaching means, such as those indicated by 17, inside the planes of the side bars, or intermediate between them, and such means are eccentric to the axes of articulation passing through the said bars.

What I claim is:

1. A chain formed of articulated links, comprising side bars, hollow cross bars separate from the side bars and located entirely within the inner faces of opposite side bars, and means for fixedly uniting the hollow cross bars and side bars, and connecting pintles for uniting the links, substantially as described.

2. A chain formed of articulated links, comprising side bars, hollow cross bars separate from the side bars, and means for fixedly uniting the hollow cross bars and the side bars, such means being eccentric to the axes of articulation and intermediate between the side bars—an axis of articulation passing longitudinally through each cross bar,—and connecting pintles for uniting the links, substantially as described.

3. In a chain, the combination of the side bars having in-turned portions, hollow cross-bars separate from the side bars, means for fixedly uniting the cross-bars to the in-turned portions of the side bars, and connecting pintles passing through the side bars and the hollow cross-bars, substantially as described.

4. In a chain, the combination of side bars, hollow cross-bars and separate wearing sleeves inserted in the hollow cross-bars and connecting pintles having bearings in the said wearing sleeves, substantially as described.

5. A chain link comprising side bars, a hollow cross-bar separate from the side bars extending between them near one end of the link, and separate sleeves inserted into the hollow cross bar and constituting bearings for a connecting pintle, substantially as described.

6. A chain comprising side bars, a connecting hollow cross-bar, means for uniting the cross-bar to the side bars, and separate sleeves inserted into the ends of the cross-bar and having their ends extending outward through the side bars beyond the outer faces thereof, substantially as described.

7. In a chain link comprising side bars having out-turned ends 4, a hollow cross-bar extending between the side bars, means for connecting the cross-bar with the side bars, separate sleeves inserted into the opposite ends of the cross-bar and extending outward therefrom through the side bars and beyond the outer faces thereof, substantially as described.

8. In a chain, the combination of the links having side bars and hollow cross-bars, wearing hubs extending out from the cross-bars through the overlapping side bars and beyond the outer face of the latter, separate interlocking blocks engaging with the said projecting ends of the said hubs, means for connecting the said interlocking blocks with the outer overlapping side bars and the connecting pintles extending through the said cross-bars, wearing hubs and interlocking blocks, substantially as described.

9. In a chain, the combination of the separate links each having side bars and a hollow connecting cross-bar, pintles extending through the overlapping side bars of adjacent links, and the cross bars, and blocks connected with the outermost side bars at each joint of the chain, through which the pintles pass and constituting thickened or extended bearings for the pintles in said outermost side bars, substantially as described.

10. A chain link comprising side bars having in-turned perforated end portions and a separate cross-bar having rivets or studs 17 arranged to register with the apertures in the said in-turned portions of the side bars and thereby unite such bars with the cross-bar, substantially as described.

11. A chain link comprising side bars and a hollow cross-bar secured thereto, the end portions of the aperture extending longitudinally through the cross-bar being round and formed with the inward extending projections 12—14 and wearing sleeves 11 fitted into ends of the cross-bar and engaging with the said projections, substantially as described.

12. In a chain, the combination of the separate links comprising side bars and hollow cross-bars, the connecting pintles or bolts uniting the links, nuts upon said bolts, and locks for preventing the loosening of the nuts, such locks being arranged to engage with the threads of the bolts to prevent endwise movement relative thereto and having means for engaging with the links and the nuts to prevent rotation of the latter, substantially as described.

13. In a chain, the combination of the separate links comprising side bars having out-turned ends 4 and hollow cross-bars, pintles for uniting the links having screw-threaded ends, nuts upon the screw-threaded ends of the bolts, and locks for preventing loosening of the nuts, the locks being of angular form and having a leg portion adapted to lie between a nut and an out-turned end 4 of a side bar of the link, and a portion arranged to engage with the threads of the pintle to prevent endwise movement relative thereto, substantially as described.

14. A chain link comprising side bars 2 and an integral cross piece 3 uniting them, and a hollow cross-bar secured directly to the said cross piece 3 and provided with bearings or seats for a connecting pintle, substantially as described.

CHRISTOPHER W. LEVALLEY.

Witnesses:
E. B. RATCLIFFE,
GEO. B. PITTS.